United States Patent [19]

Surma et al.

[11] Patent Number: 5,434,958
[45] Date of Patent: Jul. 18, 1995

[54] METHOD AND APPARATUS FOR CREATING SPECIAL EFFECTS ON VIDEO SCREEN

[75] Inventors: Michael J. Surma, Golden Valley; Earl J. Adolphi, Eden Prairie; Larry G. Peterson, Minneapolis, all of Minn.

[73] Assignee: Lifetouch Portrait Studios, Inc., Minneapolis, Minn.

[21] Appl. No.: 222,379

[22] Filed: Apr. 4, 1994

[51] Int. Cl.⁶ .............................................. G06T 3/00
[52] U.S. Cl. ..................................... 395/135; 395/133; 395/141
[58] Field of Search ................ 395/131, 133, 135, 141, 395/152–155, 161; 354/75

[56] References Cited

U.S. PATENT DOCUMENTS

| | | | |
|---|---|---|---|
| 4,823,285 | 4/1989 | Blancato | 395/135 |
| 5,055,863 | 10/1991 | Lindenfelser et al. | 354/75 |
| 5,060,171 | 10/1991 | Steir et al. | 395/135 |
| 5,139,742 | 6/1994 | Edgar | 395/131 |

Primary Examiner—Almis R. Jankus
Attorney, Agent, or Firm—Haugen and Nikolai

[57] ABSTRACT

A method and apparatus for creating a video image of a subsequent photographic print having a posed subject and a selected special effects modification added to it. Included are a computer having a data input device, a data storage device preferably housing a plurality of special effects, a data recall device, a video image capture device, and a video display device. The video image capture device provides a video image of a posed subject on the video display device, while the data recall device provides a special effect from the data storage device. Both the posed subject and the special effect are simultaneously displayed on the video display device to thereby create a combination display of the special effect and the posed subject. Examples of special effects which can be stored for recall include vignetting, burnt corners, a blend for double exposure, soft focus, captions and graphics. In this manner, a subject to be photographed can view a selection of special effects modifications to the video image and thereafter choose a desired combination of the two.

3 Claims, 2 Drawing Sheets

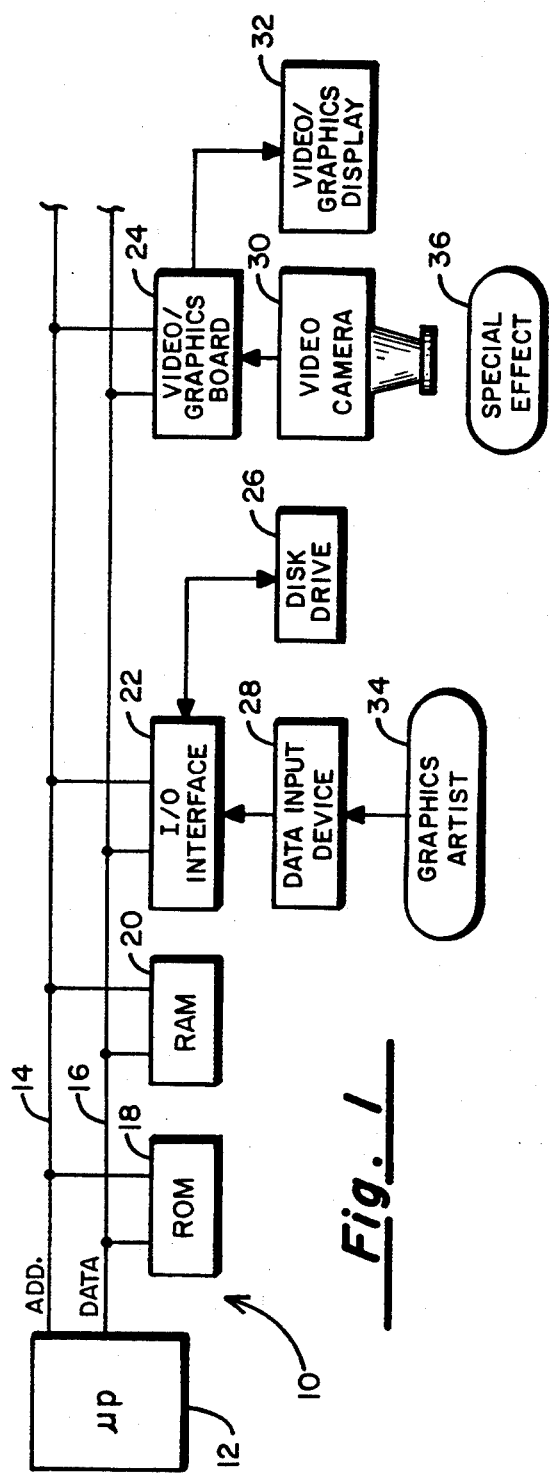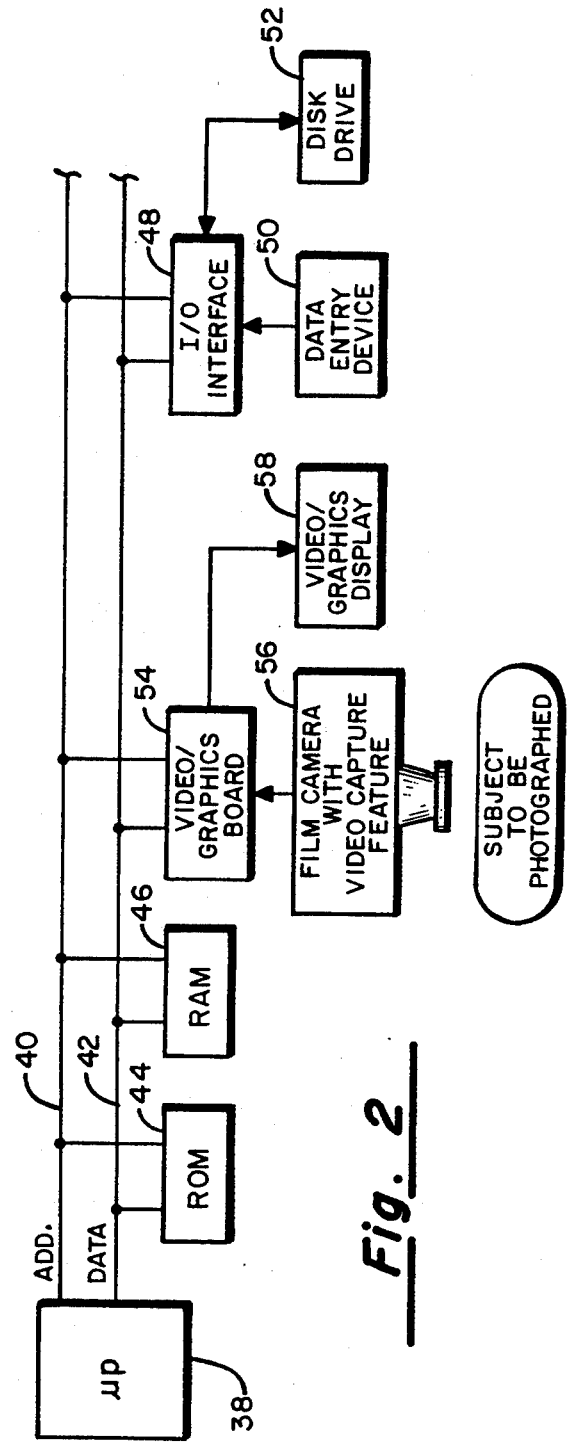

METHOD AND APPARATUS FOR CREATING SPECIAL EFFECTS ON VIDEO SCREEN

BACKGROUND OF THE INVENTION

This invention relates generally to the field of portrait photography, and more particularly to a method and apparatus for facilitating the taking of a portrait photograph by providing a video image of a subject and providing a creative special effect modification overlaid on the video image.

In the art of photography, and especially portrait photography, the photographer must be able to properly position a subject so that a desired balance and symmetry is achieved in a final portrait. Beyond proper subject placement, however, is the effective choice of a special effect which enhances the appearance of the foreground subject. Examples of choices of special effects include vignetting, burnt corners, double exposure with blend and soft focus. The special effects have been created using a "special effects wheel" in the camera positioned behind the lens where the wheel includes a plurality of masks selectable by the photographer. For further details on how the special effects wheel operates, reference is made to co-pending application Ser. No. 954,119 filed Sep. 30, 1992 entitled SPECIAL EFFECTS CARRIER. In that it has not proven feasible to locate a special effects wheel within the zoom lens of a dual ported camera, such as is disclosed in the Lindenfelser U.S. Pat. No. 5,055,863, the images carried by the special effects wheel cannot be effectively added to a video image of the subject on a monitor screen.

Additionally, some of the same special effects, as well as still other effects, may be applied at the photographic printer at the time prints of the photographic images are to be made. These additional effects include adding of captions and graphics to the resulting print. To allow previewing on a video monitor, these same special effects must be simulated.

Co-pending and commonly assigned U.S. patent application Ser. No. 08/091,659, filed Jul. 14, 1993, to Surma et al. and incorporated herein by reference, discloses a method and apparatus which enables a novice photographer to properly position a subject within the field of a photograph such that the subject's head, shoulders, arms, etc. are in proper relationship to the overall photographic rendering. This positioning is accomplished by providing a professionally created posing mask which displays markings for subject placement and which is overlaid on a video image of the subject at the photography site. This video image is identical to the image presented to the lens of a film camera operated by the photographer, thereby permitting the photographer to move the camera and/or the subject so that the subject is in alignment with the posing mask.

While the posing mask described above assures proper subject placement, the observable video image displays only the image of the subject which is available at the photography site. Thus, the customer can only guess at a choice of special effects to be included in a final print of the subject, or the film processor must provide a plurality of proofs which exemplify various available special effects. In either event, the customer may not be pleased or the cost for the service may be excessive.

It is therefore apparent that a need is present for an effective approach to realistically inform a customer wanting a portrait photograph of a subject of choices for the appearance of a finished portrait. A primary object of the present invention is to provide a method and apparatus whereby a photography subject can view an entire portrait through on-site video display of the yet to be printed portrait with at least one special effect in place.

Another object of the present invention is to provide a plurality of special effects which can be recalled at the photography site from a computer data storage means for video display with the video image of the subject.

Yet another object of the present invention is to provide a method and apparatus for both a video overlay for pose positioning and a video overlay for special effects presentation at the time a portrait photo is taken or at the time the image captured on file is to be printed at the laboratory.

These and other objects of the present invention will become apparent in the description which follows.

SUMMARY OF THE INVENTION

The present invention is a method and apparatus for creating a video image of a subsequent photographic print having a posed subject with selected special effects added. The invention comprises a computer comprising a data input means, a data storage means for storing at least one special effect, a data recall means, a video image capture means, and a video display means. The video image capture means provides a video image of a posed subject on the video display means, while the data recall means provides a special effect from the data storage means. Both the posed subject and the special effect are simultaneously displayed on the video display means to thereby create a combination display of the special effect and the posed subject. The data storage means preferably houses a plurality of special effects which can be displayed on the video display means to thereby provide a subject with representation of what the finished print will look like. Non-limiting examples of special effects which can be stored for recall include vignetting, burnt corners, a blend for double exposure, and soft focus, captions and other graphics. The special effect background choice selected by the subject is thereafter effectuated by the film processor, and may also be printed on a video display printer means.

BRIEF DESCRIPTION OF THE DRAWINGS

FIG. 1 is a block diagram of hardware employed in creating a digitized special effects;

FIG. 2 is a block diagram of hardware used in overlaying a previously-created digitized special effect on a live video image;

DETAILED DESCRIPTION OF A PREFERRED EMBODIMENT

Figure 3:
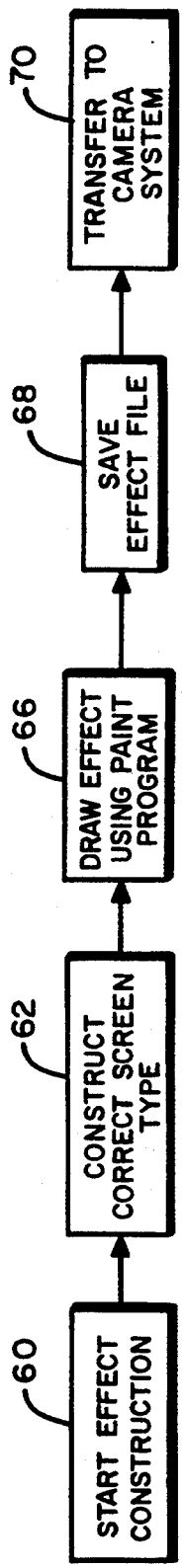
FIG. 3 is a software flow diagram of the program executed by the microprocessor of FIG. 1 in creating a special effect.

Referring to FIG. 1, there is indicated generally by numeral 10 a personal computer, including a microprocessor 12 having an address bus 14 and a data bus 16. Coupled in a conventional fashion to these two buses is a ROM memory 18, a RAM memory 20 and an I/O interface module 22. Also connected across the address bus 14 and the data bus 16 is a video graphics board 24 which may, for example, be of the type manufactured and sold by Matrox Electronics Systems Ltd. of Dorval, Quebec, Canada, and sold under the trademark, ILLUMINATOR-16 ®.

The I/O interface 22 is shown as being used to couple a disk drive 26 into the system as well as a data input device 28. The data input device may take any one of a number of forms including a keyboard, a bar code wand, a mouse, a touch screen or any other similar type device used for entering data into the RAM memory 20 under control of the microprocessor 12.

Shown coupled to the video graphics board 24 is a video camera 30 and a video/graphics display terminal 32. The Matrox video graphics board 24, when installed in a IBM ® PC or a clone thereof provides a 32,768-color video graphics workstation with the ability to manipulate 16-bit images on a pixel-by-pixel basis, store them in a 640×480 (the VGA standard) or 1K×1K pixel memory buffer and/or display the results onto a high resolution screen at specified video rates. It can also accommodate a wide variety of video signals from regular television video input to input from high-resolution cameras. By using the appropriate applications software, the Matrox board 24 can be controlled to allow image composition and it is possible to display memory, live images and VGA graphics simultaneously. The video graphics board 24 allows an image from an external source to be digitized and written into memory. This function is frequently called "frame grabbing" or "image capture". Graphics information inputted by a graphics artist 34 using the data input device 28 can also be stored in the RAM memory 20 and overlaid with video information from the video camera 30 onto the video/graphics display screen 32, via the video graphics board 24. Those desiring more information concerning the design and operation of the video/graphics board 24 may refer to the manuals available from Matrox Electronics Systems Ltd. and relating to its ILLUMINATOR-16 video graphics board.

In using the systems of FIG. 1, the graphics artist 34 will properly position a photograph of an individual in the field-of-view of the video camera 30, as represented by the "special effects" symbol 36. This photograph will have at least one special effect to be duplicated. In like manner, other photographs having other respective special effects are so placed for duplication. Next, using the data input device 28, mask information comprising the plurality of individual special effects is entered into the computer using a common "paint" type applications program to record raster images. As this data is entered by the operator, it is overlaid on the video graphics display 32 under control of the video graphics board 24 and stored with an identifying designation.

Once all of the special effect masks are thus composed by the graphics artist, they may be read out, via the I/O interface 22 to a disk drive 26, where they are stored on a magnetic disk which is transportable to any portrait studio and/or to the lab and can be used in a fashion yet to be described. The use of a disk drive is illustrative only and is not intended to limit the scope of the invention.

Referring to FIG. 2, there is depicted a block diagram of the equipment incorporated at the portrait studio where an operator may pose a subject to be photographed. The system of FIG. 2 is similar to that shown in FIG. 1 in that it includes a microprocessor 38 having an address bus 40 and a data bus 42 connected thereto in conventional fashion for controlling the execution of instructions stored in a ROM memory 44 and for entering or reading out information from a RAM memory 46. An I/O interface 48 is used to couple a data entry device 50 to the microprocessor where the mask data is to be physically transported from the creation site to the studio where it is to be used.

A video graphics board 54, which again may be a Matrox board, is connected across the address and data buses 40 and 42 and is adapted to receive input information from a portrait camera 56 having a video sensor incorporated therein. Such a camera may be of the type described in the aforereferenced U.S. Pat. No. 5,055,863. That camera is cited merely for purposes of illustration and the present invention is not limited to a system incorporating that particular camera. The video graphics board 54 is also arranged to output information to a video/graphics display device 58.

The magnetic disk prepared by the graphics artist using the equipment shown in FIG. 1 may be installed in the disk drive 52 in the portrait studio, allowing its contents to be read, via the I/O interface 48, into RAM memory 46. When a subject is to be posed for a photograph, a camera operator uses the data entry device 50 to also specify a particular special effects to be added. With a customer positioned in the field-of-view of the camera 56, his/her video image will be presented on the display screen 58 along with the special effects modification oriented on the screen at the predetermined coordinate locations earlier specified when the special effect information was created.

FIG. 3 is a software flow diagram for the application program executed by the microprocessor 12 in FIG. 1 when creating the mask information for later transfer to the portrait studio camera system of FIG. 2. As has already been mentioned, the mask information can be created using a commercially available "paint" type program. The program is entered at block 60 "Start Effect Construction." At step 62, the desired screen size and frame orientation, such as horizontal or vertical, is selected. In using the paint or raster-type program, the associated commercially-available paint program is entered and the mask effect-lines are drawn in accordance therewith (block 66). At the conclusion of the mask preparation, the information is stored (block 68) for later transfer to the camera system in the portrait studio (block 70).

In employing the raster method for developing the various special effects, a raster image of the same size as used in the portrait studio, (length/width/and bits per pixel) is created. On this raster, special effects information is "painted" using common graphics input devices (mouse, tablet, etc.) As earlier noted, the graphics artist then uses a finished photograph as an example or template to paint the areas affected by the camera or printer special effect.

Three common special effect backgrounds are referred to as burning, vignetting and masking. One method which can be employed in creating either of these effects is an overlay method wherein the pixels for burning or vignetting that are all dark on the example portrait are drawn with some value determined by the programmer on the corresponding area of the raster image. The areas where the portrait has been graded or partially darkened by the burning or vignetting have only a proportional number of the pixels on the raster drawn with the predetermined value. Another pixel value is written to every other pixel location to represent no overlay at all. A similar method is used for masking, with the white areas of the raster being assigned a predetermined value.

A second method for producing these special effects is a so-called "blending" method. Here, the burning effect is drawn as all one predetermined value where dark, and each pixel in a graded area is drawn as a proportional value toward the pixel value that represents no overlay. For example, each pixel is represented to be 15 bits (5 bits each for red, green and blue). Pixel value of 0 is used to represent black, and a value of 3FH (hexadecimal) is used for no overlay. The all-black areas of the finished portraits are represented as "0,0,0," and the no black areas are represented as "3FH,3FH,3FH" (red, green, blue). Graded values in between are represented by values in proportion to the burning (e.g. 10H,10H,10H"). A similar method is used for masking, whereby the all-white area is assigned a specific value, the all-black area is assigned another specific value, and the graded areas have proportional values therebetween. In the same manner, a solid color background can be simulated.

Graphics applied at the printer in the photo laboratory also can be simulated by creating a raster image where one value represents no overlay, as in the burning, vignetting or masking methods described above. All pixels without this value are drawn as they appear on the finished portrait. These graphics may also be scanned from an actual print by using a conventional scanner. Digital image filters, such as a low pass filter and neighborhood averaging filters, can be used to simulate the soft focus effect produced at the film camera or photographic printer.

If a double exposure is used on a portrait, the areas between the image from each separate exposure can be blended. This area of blending may be simulated by a gradation of pixels blending from one exposure to another in a manner similar to that described above for burning, vignetting and masking.

For all the above methods, more than one raster may be needed for each type of special effect. Otherwise, specific pixel values can be used to do several effects with only one raster (e.g. use red for masking and green for burning/vignetting).

All raster images are stored and transferred to the camera/proofing system.

While the apparatus of FIGS. 1 and 2 show a disk drive 26 and 52 as the means for transferring the stored information, those skilled in the art can appreciate that digital information, once stored in the memory, can be transferred to the memory of another remote processor in a variety of ways other than physically transporting a disk storing the information from one system to the other. For example, a modem and telephone lines can be used to effect such a transfer. In this fashion, a graphics artist at a headquarters location can create special effects and then transfer such information to any of a plurality of remote locations.

Figure 4:
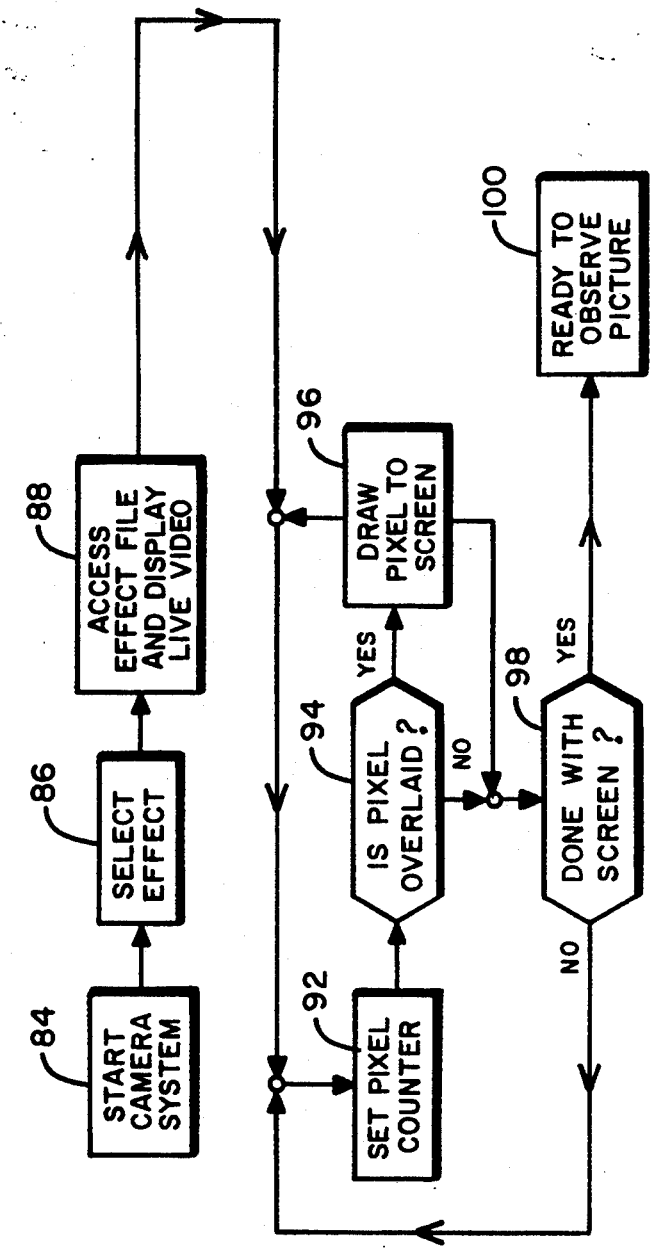
FIG. 4 is a software flow diagram of the program executed by the microprocessor of FIG. 2.

FIG. 4 is a software flow diagram for the program executed in the microprocessor 38 located at the remote portrait studio. The special effects composition is selected by the camera operator with any computer input device, such as a keyboard, bar code wand, etc. (block 86). The file containing information defining the mask for the selected modification is then accessed while the video capture apparatus in the camera 56 feeds the subject's video image to the display 58, via the graphics board 54. See block 88 in FIG. 4.

Each pixel of the raster is examined and either overlaid or not overlaid as directed by the raster image. As shown in the block diagram, this is accomplished by sequentially reading out each pixel as the pixel counter is advanced (block 92). The pixel is examined to determine whether it is to be overlaid or not (block 94) and, if so, the pixel is drawn on the display screen (block 96). If a given pixel is not to be overlaid, a test is made at 98 to determine whether that particular pixel was the last to be examined and, if so, control exits to block 100 where the camera operator now merely adjusts the position of the camera, the subject or the zoom. Had the test at block 98 indicated that there were more pixels to be examined, control loops back to the input of block 92 would advance the pixel counter so that the mask had been displayed on the video screen.

Thus, and in particular, the camera is set up for any camera-based special effect modification before the picture is taken. The picture image is captured simultaneously at the film and at the video. The video image can be captured in analog (tape, disc, etc.) or digital at this point. If analog, then it must be digitized at some later point. Information about what special effects can be on this picture are logically attached to the digitally-captured image. Digital information is then processed for special effects simulation on the same computer that captured it, or it is transferred to another station for processing and/or viewing. Printer effects can be chosen or ordered before or after the photograph is taken. The stored effect raster is loaded onto the computer, and the captured image is also loaded for processing.

In the overlay method for burning, vignetting and masking, each pixel on the loaded effects-raster is tested for overlay or no overlay. If overlay is indicated, then the corresponding pixel on the captured image is loaded with the dark overlay color. If the effect is masking, the color overlay is white. In the gradation method, each pixel on the special effects-raster image is tested for the level of burning/vignetting it contains. The corresponding pixel on the captured image is darkened proportionally according to the effects pixel value. If the effect is masking, the pixel is lightened proportionally. If the special effect is a graphic image or caption added at the printer, each pixel in the raster image is tested. If the pixel value is the designated no-overlay value, then nothing is done to the corresponding pixel on the captured image. If the pixel contains another value, then that value is overlain onto the captured image.

In simulating a special effects blend for a double exposure portrait, one image of the captured double exposure is displayed on video and the other captured image is then placed onto the image one pixel at a time. Each corresponding pixel on the raster image is tested for the level of blending. If some blending is indicated for a pixel, then the displayed pixel value is calculated by using the effects raster to add each captured pixel in inverse proportion to each other.

In addition to the raster method described above, a mathematical function method can be employed in simulating special effects on a video image. In this method, the edge or shape of the special effect may be represented by a mathematical formula, with the x,y coordinates of the formula representing points on the screen. Areas of the screen can be darkened or lightened according to the result of the mathematical function. For example, the formula for a parabola may represent the edge of a vignette effect. If a pixel is calculated to be below the parabola, it is darkened, if above, it is not changed. A gradation effect may be obtained by using a formula that darkens proportionally according to the proximity of each pixel to the parabola.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

We claim:

1. Apparatus for providing a special effects in a portrait studio setting to a video image of a subject prior to the subsequent making of a photographic film exposure of the subject, the apparatus comprising:
    (a) means at a first location for creating and displaying a video image of a photograph having a special effect thereon on a video display screen, the special effect being one of vignetting, burnt corners, a blend for double exposure, soft focus and captions;
    (b) first means for overlaying graphics of the special effect on the video display screen to create special effect mask data;
    (c) means for storing the special effect mask data relating to the special effect;
    (d) means including a microprocessor having a memory disposed at a second location for receiving and storing the special effect mask data from the storing means;
    (e) a video image capture means disposed at said second location for capturing an image of a posed subject and displaying that image on a video display screen; and
    (f) second means for overlaying said graphics defined by the stored special effects mask data on a video image of the posed subject to be photographed at said second location.

2. The apparatus as in claim 1 wherein said first and second means for overlaying graphics each comprises:
    (a) a microprocessor having a data bus and an address bus, memory means and a video graphics board coupled to said data bus and said address bus;
    (b) means for coupling said means for creating a video image to said video graphics board;
    (c) video display means coupled to said video graphics board for permitting viewing of said video image thereon; and
    (d) input means coupled to said address bus and data bus for entering said special effect mask data into said memory means and to said video graphics board with said graphics defined by said special effect mask data overlaid on said video image.

3. A method for providing special effects in a portrait studio setting to a video image of a subject prior to the subsequent making of a photographic print of the subject, the method comprising:
    (a) providing a first personal computer having a video graphics board, a data storage device, a video display and a data input device operatively coupled thereto;
    (b) providing a video image capture device for providing video information to the video graphics board;
    (c) positioning a previously made photograph having a special effect modification thereon in the field-of-view of said video image capture device;
    (d) displaying the video image of said photograph on said video display device;
    (e) overlaying special effects mask graphics selected from a group including vignetting, burnt corners, a blend for double exposure, soft focus, and captions corresponding to the special effects on the video display screen;
    (f) storing special effects mask data relating to the mask graphics in the data storage device at addressable locations;
    (g) providing a portrait camera system including a video display terminal, a video camera, a film camera, a second digital computer having a data storage device, and a data entry device;
    (h) transferring the mask data from the data storage device of the first digital computer to the data storage device of the second digital computer;
    (i) selecting predetermined special effects mask data from the data storage device of the second digital computer using the data entry device; and
    (j) overlaying mask graphics defined by the selected mask data obtained from the storage device of the second digital computer on the video display along with an image of a subject posed in the field-of-view of the video camera.

* * * * *